United States Patent
Weschler, Jr.

(10) Patent No.: US 6,651,047 B1
(45) Date of Patent: Nov. 18, 2003

(54) AUTOMATED REFERENTIAL INTEGRITY MAINTENANCE

(75) Inventor: Paul William Weschler, Jr., Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/314,802

(22) Filed: May 19, 1999

(51) Int. Cl.[7] .............................................. G06F 17/30
(52) U.S. Cl. ......................................... 707/1; 707/206
(58) Field of Search ................................ 707/201, 206

(56) References Cited

U.S. PATENT DOCUMENTS

| | | | | |
|---|---|---|---|---|
| 5,577,222 A | * | 11/1996 | Micka et al. ................ | 711/112 |
| 5,745,896 A | * | 4/1998 | Vijaykumar ................. | 707/100 |
| 5,787,415 A | * | 7/1998 | Jacobson et al. .............. | 707/2 |
| 5,832,506 A | | 11/1998 | Kuzman | |
| 5,878,408 A | * | 3/1999 | Van Huben et al. ............ | 707/1 |
| 5,978,791 A | * | 11/1999 | Farber et al. .................. | 707/2 |
| 6,044,378 A | * | 3/2000 | Gladney ................. | 707/103 R |
| 6,148,296 A | * | 11/2000 | Tabbara .......................... | 707/3 |
| 6,438,542 B1 | * | 8/2002 | Koo et al. ...................... | 707/4 |

OTHER PUBLICATIONS

Article Lightweight Directory Access Protocol (v3), by M. Wahl et al., Dec. 1997.
Article "Lightweight Directory Access Protocol (v3) Extensions for Dynamic Directory Services" By Y. Yaacovi et al., May 1999.

* cited by examiner

*Primary Examiner*—Frantz Coby
*Assistant Examiner*—Hanh Thai
(74) *Attorney, Agent, or Firm*—William J. Kubida; Kent A. Lembke; Hogan & Hartson LLP (57) ABSTRACT

A technique for maintaining referential integrity between data records in any data architecture in which only a single copy is kept of any particular data record. The technique includes providing the ability to bind a data record to a parent data record by storing the data record in a manner associated with the parent record. If the data record then is bound to other parent data records, a link reference is used that is stored in an attribute of the data record, rather than associating another copy of the data record with the second parent data record. It is possible to bind any data record to any other data record, so circular relationships can be created. In addition, there are special methods used when a data record is to be deleted to make sure that all parents or children of that data record are considered, in order to update bind information or delete the children as may be appropriate.

20 Claims, 9 Drawing Sheets

AUTOMATED REFERENTIAL INTEGRITY MAINTENANCE

The present invention relates, in general, to related data records, and, more particularly, to a method and system that maintains referential integrity for related data records, whether the date is distributed or not.

BACKGROUND OF THE INVENTION

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network (LAN). In such systems powerful server computers (e.g., application servers and file servers) are used to process and access data. The requested data is then transmitted to the client computer for further processing. To scale to larger networks, multiple LANs may be internetworked using, for example, leased data lines to create a wide area network (WAN). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as a file server for sharing data with other client computers. Each software application running on the client, or the client's operating system (OS) may save client-specific configuration data that is used by the client to fine-tune and define the user's software environment at runtime.

As used herein, the term "profile information" refers to any information or meta-data used by a particular piece of hardware, software application, or operating system to configure, initialize, shut-down, aid in making run-time decisions, or the like for a computer. The profile information may be associated with a particular application or group of applications, a particular hardware device or group of devices, as well as a particular user or group of users. Some operating systems store user profile information that is used during boot operations at application start-up, to tailor a limited number of the system characteristics to a particular machine user. However, this profile information is closely tied to a single machine and operating system. As a result, the profile information is not useful to a new user the first time that user logs onto a particular machine. Moreover, this information is not available to remote users that are accessing the LAN/WAN using remote access mechanisms.

Existing mechanisms tend to focus on a single type of profile information—user information or application information or hardware information. Also, because these mechanisms are very application specific they limit the number and type of attributes that can be retained. Further, the profile information is isolated and fails to indicate any hierarchical or relational order to the attributes. For example, it may be desirable that a user group is required to store all files created using a particular application suite to a specific file server. Existing systems, if such a service is available at all, must duplicate profile information in each application program merely to implement the required file storage location preference. Storage location direction based on a user-by-user or user group basis is difficult to implement and may in fact require a shell application running on top of the application suite. Even then, the system is not extensible to access, retrieve, and use profile information for a new user that has not used a particular machine before.

As in the example above, existing systems for storing configuration information lead to duplicative information stored in many locations. Each application stores a copy of its own configuration information, as does each hardware device and each user. Much of this information is identical. It is difficult to maintain consistency among these many copies in distributed data environments. For example, when the specified file storage location changes, each copy of the configuration information must be changed. The user or system administrator must manually track the location and content of each configuration file. An example of the inefficiencies of these types of systems is found in the Windows 95 registry file that holds profile information but has an acknowledged tendency to bloat over time with duplicative and unused data. Moreover, the registry file in such systems is so closely tied to a particular machine and instance of an operating system that it cannot be remotely accessed and used to configure other computers or devices. Hence, these systems are not generally extensible to manage multiple types of profile information using a single mechanism. A need exists for profile information that is readily accessible to all machines coupled to a network and to machines accessing the network through remote access mechanisms.

Peer-to-peer type networks are an evolutionary change to client/server systems. In a peer-to-peer network each computer on the LAN/WAN can act as a server for applications or data stored on that machine. A peer-to-peer network does not require, but is able to, run alongside a client/server system. Peer-to-peer architectures offer a potential of reduced complexity by eliminating the server and efficient use of resources available in modern client and workstation class computers. Peer-to-peer networks, however, remain dependent on a secure, closed network connection to implement the LAN/WAN. Such networks are difficult to scale upwardly.

Peer-to-peer solutions also do not scale well because, as the network becomes larger, it becomes increasingly difficult to identify which peer contains the applications and data needed by another peer. Moreover, security becomes more difficult to manage because the tasks of authorizing and authenticating users is distributed among the peer group rather than in a centralized entity. A need exists for a system and method that enables a peer-to-peer architecture to scale without reduced performance, ease of use, and security.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured e-mail application to access e-mail while working from a workstation but prefer a more compact application to access the same data when using a handheld computer or cellular phone. In each case, the network desirably adapts to the changed conditions with minimal user intervention.

In order to support mobile users, the client/server or peer-to-peer network has to provide a gateway for remote access. Typically this has been provided by a remote access server coupled to a modem. Remote users would dial up the modem, comply with authorization/authentication procedures enforced by the server, then gain access to the network. In operation, the mobile user's machine becomes like a "dumb terminal" that displays information provided to it over the dial-up connection, but does not itself process data. For example, a word processing program is actually executing on the remote access server, and the remote user's machine merely displays a copy of the graphical user interface to the remote user. The remote user is forced to use the configuration settings and computing environment implemented by the remote access server. A need exists for a method and system for remote access that enables the remote user to process data on the remote machine without being confined to using configuration settings imposed by a remote access server.

There is increasing interest in remote access systems that enable a user to access a LAN/WAN using a public, generally insecure, communication channels such as the Internet. Further, there is interest in enabling LANs to be internet-worked using public communication channels. This is desirable because the network administrator can provide a single high speed gateway to the Internet rather than a remote server/modem combination for each user and expensive WAN communication lines. The Internet gateway can use leased lines to access the Internet rather than more costly business phone lines. Also, the Internet gateway can be shared among a variety of applications and so the cost is not dedicated solely to providing remote access or wide area networking. The reduction in hardware cost and recurrent phone line charges would be significant if remote users could access the LAN/WAN in this manner.

In an enterprise system it is critical that distributed resources remain available. Access to profile information is often prefatory to using a particular system or software application for meaningful work. High availability is accomplished in most instances by replicating critical resources and managing the replicas so that they remain consistent. Replication leads to difficulties in keeping the replicas consistent with each other. This is particularly true for profile type information that may be controlled by or owned by a variety of entities/systems. For example, a user may own profile information related to that user's preferences, passwords, and the like. However, a workgroup administrator may own profile information related to group membership, group security policies, and the like. Further still, individual applications may own profile information describing that application's configuration operations. In an environment where any entity can change the information contained in any profile that it owns at any time, it quickly becomes an intractable problem to maintain consistency among multiple replicas. A need exists for a system and methods for maintaining profile information owned by a diverse set of entities in a highly available manner.

From a network user's perspective, these limitations boil down to a need to manually configure a given computer to provide the user's desired computing environment. From a remote user's perspective, these limitations require the user to manually reconfigure the remote access computer to mimic the desired computing environment or tolerate the generic environment provided by default by the remote access server. From a network administrator's perspective, these complications require software and operating systems to be custom configured upon installation to provide the desired computing environment. In each case, the time and effort consumed simply to get "up and running" is a significant impediment to efficient use of the distributed computing environment. What is needed is a system that readily adapts to the changing, heterogeneous needs of a distributed network computing environment.

One solution to the problem of finding resources in a distributed system is to use directories. Directories are data structures that hold information such as mail address book information, printer locations, public key infrastructure (PKI) information, and the like. Because of the range of functions and different needs of driving applications, most organizations end up with many different, disparate directories. These directories do not interact with each other and so contain duplicative information and are difficult to consistently maintain.

Meta-directories are a solution that provides directory integration to unify and centrally manage disparate directories within an enterprise. A meta-directory product is intended to provide seamless integration of the multiple disparate directories. However, existing solutions fall short of this seamless integration because the problems to be solved in directory integration are complex. Existing meta-directory solutions tend to require significant up front configuration effort to account for these complexities. Also, a meta-directory product must be aware of the data format for each of the data structures that it is supposed to integrate. This required knowledge makes meta-directories difficult to maintain in a computing environment that is rapidly changing. As a result, meta-directory solutions are not sufficiently extensible to account for the wide variety of resources available on a distributed network. In the past, meta-directory technology has not been used to catalog meta-data of a sufficiently general nature to meet the needs of a dynamically growing and changing distributed computing environment.

X.500 is one current model for managing on-line directories of users and resources (Directory Services) that includes the overall namespace as well as the protocol for querying and updating it. An X.500 directory is called a Directory Information Base ("DIB") and the program that maintains the DIBs is called a Directory Server Agent ("DSA"). A Directory Client Agent ("DCA") is used to search DSA sites for names and addresses.

The protocol generally used in conjunction with X.500 is the "DAP" (Directory Access Protocol) and it operates over the OSI (Open System Interconnection) network protocol stack. Due to the fact that a full DAP client is difficult to implement on smaller computer systems, the LDAP, (Lightweight Directory Access Protocol) was developed.

Like X.500, LDAP is both an information model and a protocol for querying and manipulating the information model. The overall data and namespace model is essentially that of X.500. A fundamental difference between DAP and LDAP is that the latter protocol is designed to run directly over the TCP/IP (Transmission Control Protocol/Internet Protocol) stack, and it lacks some of the DAP protocol functions such as security. In operation, LDAP enables a user to locate organizations, individuals, and other resources such as files and devices in a network, whether on the Internet or on a corporate intranet.

In a network, a directory is used to indicate where in the network something is located. On TCP/IP networks (including the Internet), the Domain Name System ("DNS") is the directory system used to relate the domain name to a specific network address or unique location on the network. If the domain name is not known, LDAP allows a user to initiate a search for, for example, an individual without knowing exactly where he is located. Simply stated, an LDAP directory is organized in a simple "tree" hierarchy and may consist, for example, of the following levels:

The "Root" directory (the starting place or the source of the tree), which branches out to Countries, each of which branches out to Organizations, which branch out to Organizational units (divisions, departments, and so forth), which branches out to (includes an entry for)

Individuals (which includes people, files, and shared resources such as printers)

An LDAP directory can be distributed among many servers, and each server can have a replicated version of the total directory that is synchronized periodically. When an LDAP server receives a request from a user, it takes responsibility for the request, passing it to other DSAs as necessary, but nevertheless ensuring a single coordinated response for the user.

The Internet Engineering Task Force (IETF) is a large open international community of network designers, operators, vendors, and researchers concerned with the evolution of the Internet architecture and the smooth operation of the Internet. IETF publishes specifications for various internet protocols including LDAP. The current LDAP protocol is specified in RFCs (Request For Comments) 1777 and 1778 while the string representation of LDAP search filters is specified in RFC 2254. The disclosures of RFC 1777, RFC 1778 and RFC 2254 are specifically incorporated herein by this reference.

Finally, as to related data elements, whenever a data element in a data architecture will be accessed by different users or entities, and particularly in distributed data systems, it is desirable to minimize data synchronization issues. If multiple copies are maintained of the same data record, then there will always be issues relating to the synchronization of the various copies of the data record.

It is against this background, and the desire to solve the problems of the prior art, that the present invention has been developed.

SUMMARY OF THE INVENTION

Briefly stated, the present invention relates to a method of providing referential integrity in a data architecture, the data architecture including a plurality of data elements, wherein certain of the data elements are linked to other of the data elements. The method includes providing the ability for a first data element to depend from and be linked to a second data element and providing the ability for the first data element to also depend from and be linked to a third data element. The first data element is only stored in one location, the storage being associated with the second data element, with only a referential link between the first data element and the third data element.

The location of the first data element may be associated with the second data element through a ResourceID. The method may further include providing the ability for a fourth data element to depend from and be linked to the first data element. The fourth data element may depend from and be linked to any one of, or any combination of, the first, second, and third data elements. The second or third data element may depend from and be linked to the fourth data element. The second or third data elements can depend from and be linked to other data elements. The method may further include, when a given data element is to be deleted, checking to see if the given data element has other data elements depending from the given data element. The method may further include, if the given data element has other data elements depending therefrom, deleting the dependent data elements if the dependent data elements are not dependent on other data elements.

The method may further include, if the given data element has other data elements depending therefrom and the dependent data elements are dependent on other data elements, determining if the dependent nature of the dependent data element to the given data elements is a true bind or is a link reference. The method may further include, if the dependent nature of the dependent data element to the given data element is a true bind, changing the storage of the dependent data element to a storage associated with one of the other data elements to which the dependent data element is dependent. The method may further include determining if the dependent data element is also dependent on data elements in addition to the one to which the dependent data element now has associated storage. The method may further include, if the dependent data element is also dependent on data elements in addition to the one to which the dependent data element now has associated storage, updating linking information related thereto.

The present invention also relates to a data architecture that automatically provides referential integrity. The data architecture includes a plurality of data elements including a first data element, a second data element, and a third data element, wherein certain of the data elements are linked to other of the data elements. The first data element depends from and is linked to a second data element. The first data element depends from and is linked to a third data element. The first data element is only stored in one location, the storage being associated with the second data element, with only a referential link between the first data element and the third data element.

The data architecture may further include a fourth data element depending from and linked to the first data element. The fourth data element may depend from and be linked to any one of, or any combination of, the first, second, and third data elements. The second or third data element may depend from and be linked to the fourth data element. The data architecture may further include, when a given data element is to be deleted, checking to see if the given data element has other data elements depending from the given data element, and, if the given data element has other data elements depending therefrom, deleting the dependent data elements if the dependent data elements are not dependent on other data elements.

The data architecture may further include, if the given data element has other data elements depending therefrom and the dependent data elements are dependent on other data elements, determining if the dependent nature of the dependent data element to the given data elements is a true bind or is a link reference, and, if the dependent nature of the dependent data element to the given data element is a true bind, changing the storage of the dependent data element to a storage associated with one of the other data elements to which the dependent data element is dependent. The data architecture may further include determining if the dependent data element is also dependent on data elements in addition to the one to which the dependent data element now has associated storage, and, if the dependent data element is also dependent on data elements in addition to the one to which the dependent data element now has associated storage, updating linking information related thereto.

The present invention also relates to a computer program product embodied on a propagating signal. The computer program product includes computer program devices readable by a data processor coupled to receive the propagating signal for providing referential integrity in a data architecture, the data architecture including a plurality of data elements, wherein certain of the data elements are linked to other of the data elements. The computer program devices include first program code devices configured to cause the data processor to provide the ability for a first data element to depend from and be linked to a second data element, second program code devices configured to cause the data processor to provide the ability for the first data element to also depend from and be linked to a third data element, and third program code devices configured to cause the data processor to allow the first data element to only be stored in one location, the storage being associated with the second data element, with only a referential link between the first data element and the third data element.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to any environment with related data records, including significantly larger, more complex network environments as well as small network environments such as conventional LAN systems.

It is contemplated that the present invention will be particularly useful in environments that require a data structure that is quickly searched and where the data is suited to a hierarchical representation. Also, the system of the preferred implementation is optimized to store and make available relatively compact units of data that serve to configure devices and computer environments rather than operational or analytical data upon which the computer environment may operate at runtime. Hence, while the present invention is applicable to many different environments, it is possibly best used when it stores and retrieves data that is frequently searched and retrieved, but infrequently changed.

To aid understanding several words and terms used herein to describe the present invention are defined below:

Attribute—The combination of a key related to one or more values, frequently described as a key=value pair.

Binding—A special type of attribute where the value of the key=value pair is itself a Profile. By binding one Profile to another in a chained fashion it is possible to build tree structures of related profiles and attribute information (called a profile tree).

Profile—A collection of attributes related either directly or indirectly to a EntityProfile that represents some sort of entity such as a user.

EntityProfile—A collection of attributes that establish the root of a profile tree and serve as the base representation of some entity. This is the core data object around which the entire Profile Service is designed to function. In an object oriented sense, an EntityProfile extends a Profile to add special functions and behavior.

ProfileList—A special type of Profile whose member attributes (with the exception of some system attributes) are themselves Profiles. In an object oriented sense, a ProfileList extends a Profile to add special functions and behavior.

Profile Service—The term generally used to refer to all of the functional interfaces of Profile Service. The term is used to refer specifically to the core Profile Service interface.

Profile Service Interface—The core functional interface of the Profile Service. This interface provides functions for creating, searching and removing profiles in addition to some administrative utilities.

Profile Interfaces—A term used to collectively refer to the functional interfaces of Profile, EntityProfiles and ProfileLists. These interfaces provide functions for manipulating the composition of individual Profiles.

Profile Protocol—A data transport methodology that exposes functional interfaces in a language and platform independent manner. It is a distributed communication mechanism implemented in the examples herein as extensible markup language (XML) over hypertext transfer protocol (HTTP), although other suitable languages, protocols, and transport methodologies could be used.

Resource ID—An identifier that is constructed by the Profile Service to uniquely identify every constituent profile and attribute therein. Resource IDs have a defined string structure.

Profile Type—A special attribute of all Profiles. This attribute is mandatory for all profiles and plays an important role in generating resource IDs and data indexing.

Entity—Entity ID—A special attribute of all EntityProfiles. This attribute plays an important role in generating resource IDs and data indexing. The Profile Service enforces the rule that all entity IDs are unique within the set of all EntityProfiles of the same type.

List Key—A special attribute of all ProfileLists. This attribute plays an important role in generating resource IDs and data indexing. The Profile Service enforces the rule that all profiles bound to a ProfileList are bound to the key such that that the ProfileLists may only have one member Profile with a specific list key value.

List Members—A term used to refer to the collection of Profiles bound to a ProfileList. Each bound profile is referred to as a member.

True Bind—A type of bind that is established for a Profile when the Profile is not yet bound to any other Profile. The True Bind is manifested in the Resource ID of the Profile.

Link Bind—A type of bind that is established for a Profile after the Profile has already been bound to another Profile. Instead of the Resource ID reflecting the Link Bind, the Link Bind is manifested in a bind attribute that refers to the parent Profile to which the Profile is bound.

Figure 1:
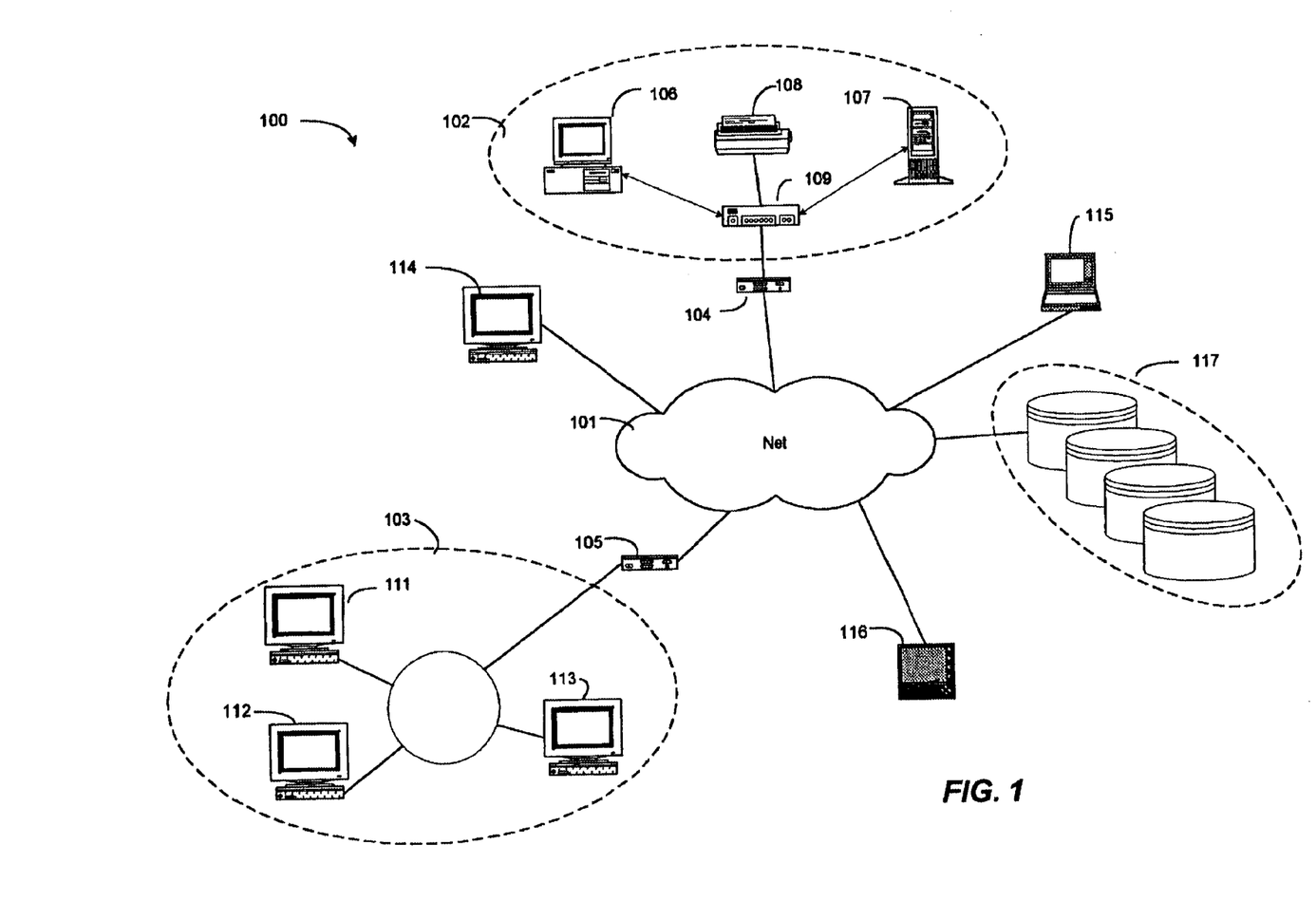
FIG. 1 illustrates an exemplary network computing environment in which the present invention is implemented.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional WAN technologies.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 109 is coupled through gateway 104 to provide shared access to network 101. Gateway 104 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 117 that provides mass storage capacity beyond what an individual device can efficiently use and manage. Selected components of the present invention may be stored in or implemented in shared mass storage such as disk farm 117.

Figure 2:
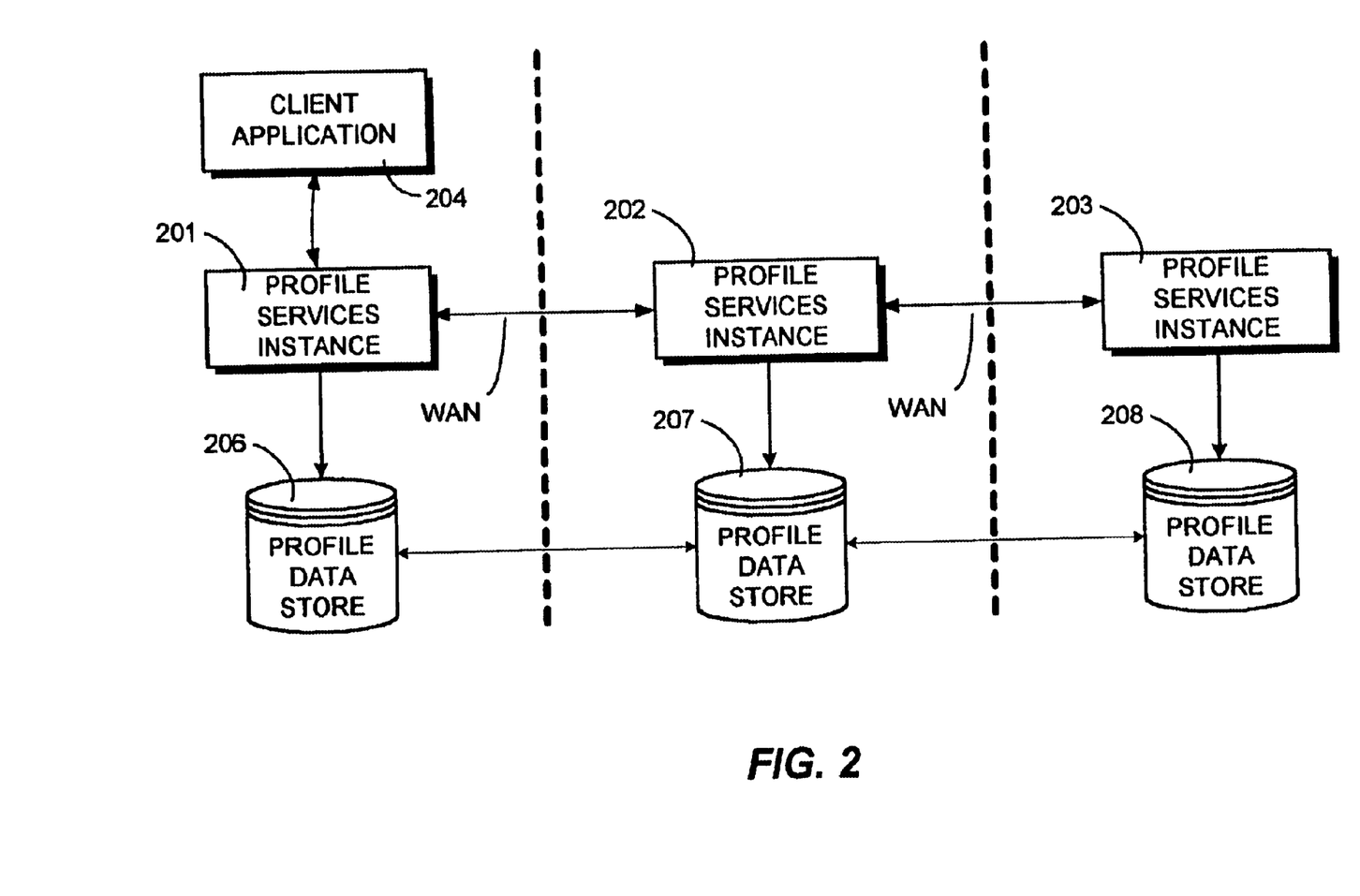
FIG. 2 shows a more specific network architecture in which in which the present invention is employed in a simple form.

FIG. 2 shows a generalized diagram of a distributed computing environment implementing the profile services in accordance with the present invention. The environment of FIG. 2 includes three profile services instances 201, 202 and 203. Each profile service instance is implemented in a separate local environment (e.g., a LAN or stand-alone environment) as suggested by the dashed vertical lines in FIG. 2. The local environments are coupled by an available WAN connection. A client application 204 accesses the profile service instance 201 to request profile services. The profile service instance 201 performs the requested service using the profile data store 206. Each profile service instance 201, 202, and 203 is associated with a data store 206, 207, and 208 respectively. The data store is local to the associated profile service instance meaning that the data store is directly accessible by the profile service without reliance on the WAN connection.

The profile service data structure is replicated across data stores 206, 207 and 208. That is to say, when profile or attribute information is added or updated in one data store, that add or update is preferably replicated across each other data store. Replication increases availability and accessibility. It is not required that all profile data be replicated as the frequency and methodology for replication can be selected by a system administrator to meet the needs of a particular environment. However, at least some profile data is replicated in the examples.

Figure 3:
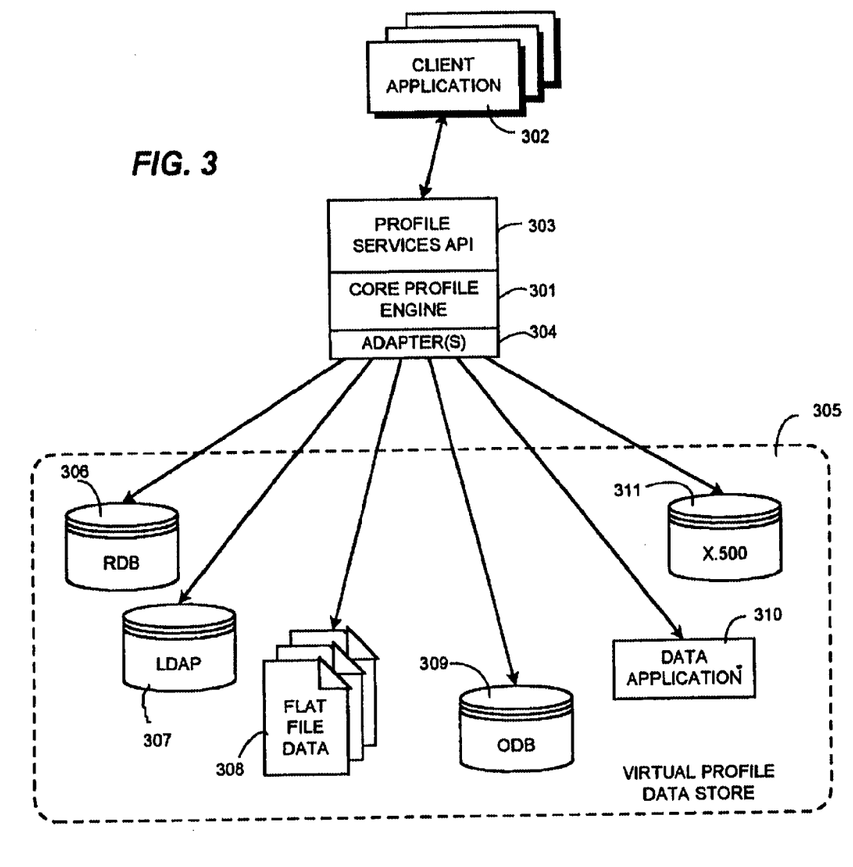
FIG. 3 shows in block diagram form significant components in a particular example of a profile service mechanism in accordance with the present invention.

FIG. 3 shows a more specific example of the present invention implemented in a gateway or firewall server such as gateway 104 or gateway 105 in FIG. 1. The components implemented in a gateway machine include a core profile engine 301 that is accessed by a client application 302 through a profile services application programming interface (API) 303. API 303 provides an interface that enables client applications that have a corresponding interface to send messages that enable the application to send data and commands to request profile services from core profile engine 301. In a particular implementation the profile services API 303 provides three basic functions. First, the profile services API 303 provides "factory" methods for creating profiles. Second, the profile services API 303 provides search and retrieve methods for accessing existing profiles. Third, the profile services API 303 provides management utilities for defining schemas.

Core profile engine 301 responds to the client application requests by executing requested functions on virtual profile data store 305. Core profile engine 301 maintains a set of meta-data about every attribute and binding for every profile. This meta-data controls how the profile engine 301 makes the profile data available to client applications 302. This meta-data includes, but is not limited to, information regarding owner identity, read-write-modify permissions, group membership, timestamps, triggers, and the like.

Virtual profile data store 305 may comprise a single data storage device, but more often comprises a plurality of disparate, heterogeneous data storage devices. The specific example of FIG. 3 includes a relational database 306, lightweight directory access protocol 307, flat data file 308, object oriented database 309, and X.500 directory 311. An adapter 304 may also access another data application 310 where the data application 310 provides an API compatible with the adapter 304 and operates to access other local and distributed data stores. In a particular implementation, adapter(s) 304 comprise an adapter for each data store device and/or protocol. Each adapter 304 includes an interface to core profile engine 301 and a special purpose interface configured to the specific data store within virtual data store 305 that it is intended to access. Virtual data store 305 includes a dynamically changing number of data store devices as devices can be added, changed, and deleted by modifications to the associated adapter 304.

The profile service in accordance with the present invention provides a high-speed mechanism to lookup, structure and store key/value pairs. These key/value pairs represent information about "entities" such as application software, users, hardware devices, and the like. The present invention is preferably implemented as a service running on a gateway server. The present invention is intended to integrate several physical data stores into a single, distributed logical data store of reference information.

Figures 4A, 4B:
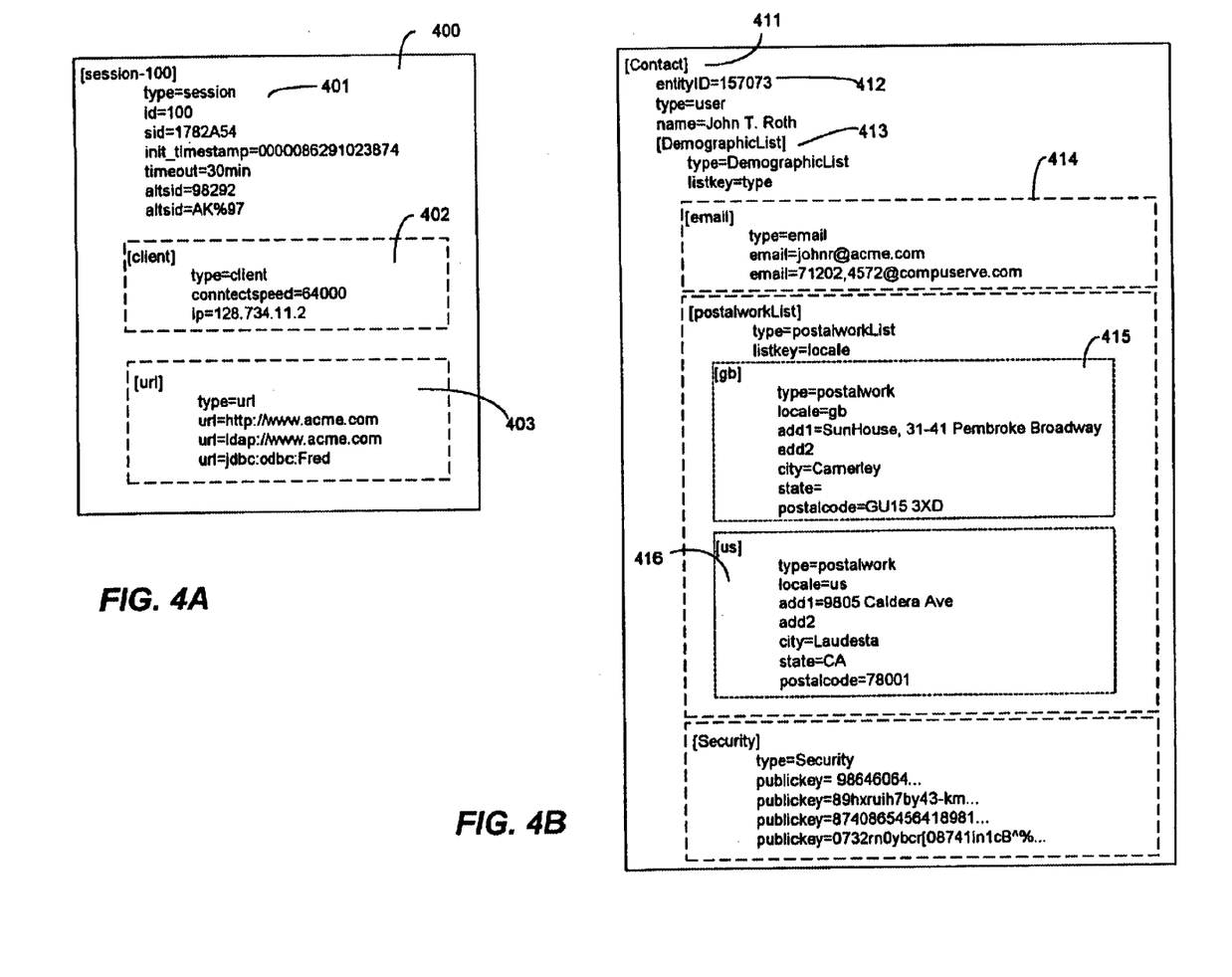
FIG. 4A and FIG. 4B show exemplary data structures for holding profile objects in accordance with the present invention.

As used herein, a "profile" is a group or set of key/value pairs, such as shown in FIG. 4A and FIG. 4B where each key/value pair is referred to as an "attribute". The value associated with a given key may be either a primitive value (e.g., a numeric value, string value, logical value, and the like) or may be another profile. When the value is another profile the value is referred to as a "sub-profile" or "binding" and illustrates the hierarchical nature of the present invention.

All profiles contain a type attribute. When the value of an attribute is a sub-profile, the key will be the type of the sub-profile. In the case when the value is a sub-profile the key/value pair is called a "binding". By binding several profiles it is possible to build hierarchical trees of information. It is possible to bind a profile to multiple parent profiles which is referred to herein as "linking". Linking enables the representation of relational information by creating a Directional Acyclical Graph (DAG) in addition to hierarchical information.

Profiles are not restricted in type as defined by the profile's attribute key or number of attributes that may be stored in a single profile. Moreover, individual attributes may have multiple values set as illustrated by the publickey attribute in FIG. 4B. However, each binding has only a single value, although each profile may contain any number of bindings. As described hereinafter, a user may define a schema that forces profiles of specified types to contain at least a minimum set of attributes upon creation. A schema aids in providing uniformity and a minimal level of compatibility without limiting the dynamic and extensible nature of the profiles in accordance with the present invention.

FIG. 4A shows a data structure 400 illustrating a general implementation of a profile. Data structure 400 shows a profile for a session (e.g., information about a user session on a software application, network connection, hardware device or the like). The profile service in accordance with the present invention represents and stores a special type of object called a profile in a data structure 400. As used herein, the term "object" refers to a data structure stored in mass storage or memory accessible by a computer that contains specified data and a set of methods or operations that enable the object to perform operations on the data it contains. The methods contained in an object also implement an interface enabling the object to receive data from and send data to other computer program devices. Data structure 400 is a representation of a profile object. It should be understood that the physical implementation of data structure 400 may vary significantly from application-to-application and may be implemented as a contiguous segment of storage locations or a dispersed arrangement of physical locations that are logically ordered in a manner shown in FIG. 4A.

An individual profile in data structure 400 comprises 0 to n attributes or key=value pairs 401 and 0 to n sub-profile bindings 402 where "n" is an arbitrary value selected to meet the needs of a particular application. In the example of FIG. 4A, profile names are enclosed by brackets [ ] and attributes 401 are represented as key=value pairs. The profile shown in FIG. 4A is named "session-100" and has a number of attributes 401 and one sub-profile binding 402 to a "client profile" that comprises information about the client who initiated this session. The client sub-profile in data structure 400 is also referred to as a "child" profile.

Significantly, all profiles have a "type" attribute. This attribute is set when the profile is created and is not changed. Attributes may have multiple values as does the "altsid" attribute in data structure 400. Attribute and binding keys are unique within the profile. Attribute values are either a string, another profile, or an external data reference. The attribute "ip=128.734.11.2" in data structure 400 is an example of an external data reference.

In general, when a profile is created it must be the "child" of some other profile, or it must be an "entity profile". An entity profile 411, such as shown in FIG. 4B, is a special subclass of a profile object that has an additional fixed attribute 412 called an entityID. EntityIDs are assigned in a manner such that each ID is unique within the set of other entities of the same type. In this sense, the profile shown in FIG. 4A is not truly accurate because it is neither a child (i.e., it is not within another profile) nor an entity profile (i.e., it does not include an entityID attribute). The profile service in accordance with the present invention provides facilities for generating the ID in a manner such that all entity profiles of the same type have unique IDs. Essentially, entity profiles serve a special role of establishing roots from which other profiles may be attached. Entity profiles support all of the operations of a profile, but add in addition support for some specialized methods for accessing the ID attribute.

The data structure in FIG. 4B shows an entity profile "Contact" that includes a number of attributes including a sub-profile binding "DemographicList". The profile DemographicList itself contains sub-profile bindings "email", "postalworkList", and "Security".

Entity profiles are used to represent data that has no single child relationship to another profile, or when no other profile exists. Entity profiles are useful to represent users, contacts, resources, components, groups, and the like. All of these entities have a discreet and meaningful independent existence and role in the real world. In contrast, conventional profiles (i.e., non-entity profiles) must always be attached as a child to either an entity profile or another non-entity profile. Non-entity profiles are useful for representing data such as display preferences, demographic information, identification information, and the like. All of these groups of information are meaningless unless related to some stand alone concept such as a user, resource, component, and the like.

PostalworkList in FIG. 4B is an example of another special profile type called a "profilelist". A profilelist relates multiple profiles of the same type to a single parent. This is done by binding a single profile list (e.g., postalworklist) to the parent (e.g., Contact) with multiple member profiles (e.g., "gb" and "us" in FIG. 4B) are added to the list. While ProfileLists serve to collect profiles of the same type, it is contemplated that they may also be used as a convenient collection object for sub-profiles of different types. It is important to note that profilelist member profiles contain a limited set of attributes and do not support the concept of a schema. As a result of this limitation, several profile operations are not supported by ProfileLists.

Figure 5:
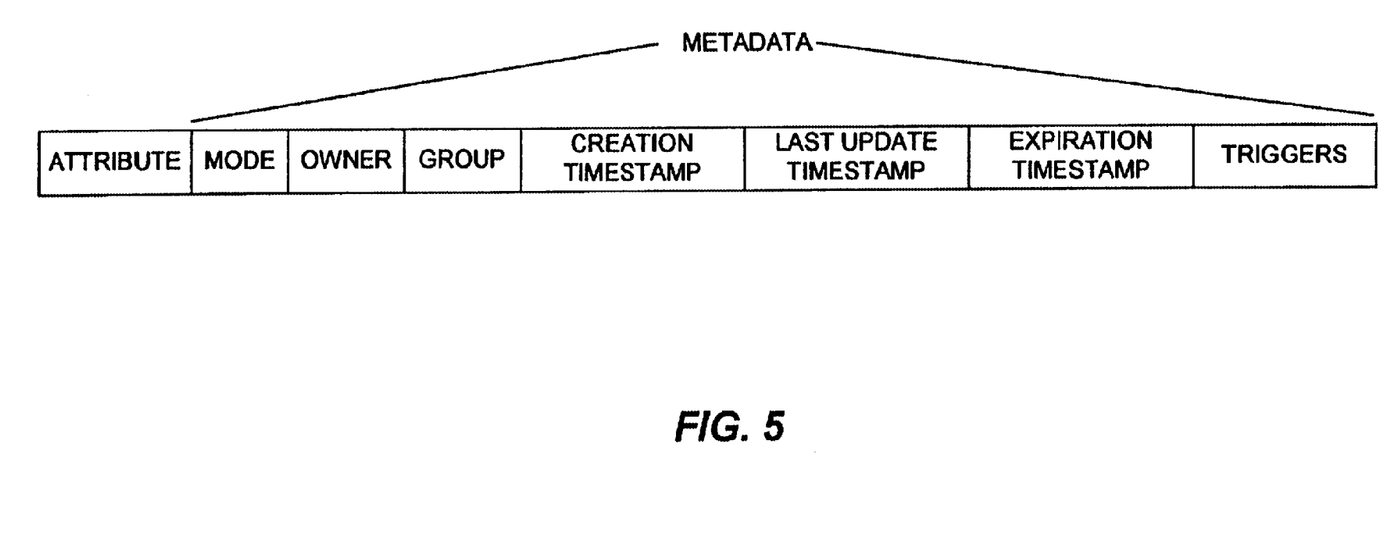
FIG. 5 illustrates meta-data fields of a portion of a profile in accordance with the present invention.

An important feature of the present invention is that each attribute and binding in a profile is associated with a set of meta-data maintained and used by core profile engine 301 (shown in FIG. 3). An example attribute object with associated meta-data variables is shown in FIG. 5. The meta-data may be implemented in the same object as the profile, or may be implemented in a separate object associated with the specified attribute. Table 1 describes the meta-data shown in FIG. 5.

TABLE 1

| Meta-data | User Settable | Constraints | Default Value |
| --- | --- | --- | --- |
| Mode | X | Any valid Unix file permission | 764 |
| Owner | X | Must be a string | The entity ID of the user creating the attribute |
| Group | X | Must be a string | none |
| Creation Timestamp | | NA | The time at which the value was initially set |
| Last update timestamp | | NA | The last time a value was set |
| Expiration timestamp | X | No greater than 7 years from the current time | 7 days from the initial creation of the attribute |
| Triggers | X | Must be in a format understood by the enabled notification mechanism. | none |

In a particular implementation, timestamps are stored as "stringified" long values such that they are readily converted to date objects in a computing environment such as the Java™ computing environment. Java is a trademark or registered trademarks of Sun Microsystems, Inc. in the United States and other countries. If the default mode or expiration is not a value that is desired, users are able to change the default value assuming the user has execute permission on that attribute or binding. If expiration longer than the default maximum of seven years is desired the attribute's creator will have to arrange to update the attribute before the expiration. The intent of the expiration function is to clean house by removing unused attributes which may otherwise clutter the profile services data structures.

The profile service in accordance with the present invention supports data level access control mechanisms. As currently implemented, the data level access control mechanism supported is analogous to Unix file system permissions. In the mode meta-data field the first digit indicates owner privileges, the second digit indicates group privileges, and the third digit represent world privileges. Each digit is allowed to have a value that is any combination (e.g., sum) of read(4), write(2), execute(1) and none(0) following Unix file permission methodology. A value of "7" indicates read, write, and execute privileges whereas a value of "4" indicates read only, a value of 3 indicates write and execute only, and the like. In this manner the meta-data storage feature described hereinbefore enables an owner and group membership to be specified for every attribute and binding within a profile. Access permissions can be specified on an attribute and binding basis for the specified owner, group, and world. This feature of the present invention provides a powerful tool for both sharing information within a profile while controlling the information that is shared with other systems and users. While a scheme analogous to Unix file system permissions has been described, any other suitable data level access control mechanism could be supported.

For example, the profile service can be used to create a plurality of entity profiles where each entity profile corresponds to a workgroup in an organization (e.g., the entity profile type is set to "group"). Each group is allowed to contain a reference to another group or some other entity having an entity profile. In this example, each entity profile representing a group has its permissions set to "744" such that the owner has read, write, and execute privileges, while the group members and world have read only privileges. The owner of the group profile is separately specified in the owner meta-data field, and may be an individual, software application, or a plug in group service that is added on to the core profile service engine.

In this manner, the attributes stored in each of the group entity profiles may be read by any entity in an enterprise. Other users, other software applications, and other instances of the profile service can read the profile data and create enterprise wide unique ID's for profiles so long as that other entity can connect to the profile service maintaining the group entity profiles. However, only the specified owner can modify the group entity profiles.

In another example a user service has standardized the definition of "Users" by creating a EntityProfiles of the type "user". This service sets the mode on each attribute of the User profile to "744" so that user profiles as they are defined are read only unless the user service itself accesses the profile as the owner of the attribute. Significantly, the 744 mode designation applies only to attributes created by the user service that initially created the profile. A subsequent entity can add additional attributes, including bindings to sub-profiles, to the profile without breaking the 744 access control rules. These added attributes can be created with a new specified owner and new permissions. In other words, attributes and bindings within a single profile may have multiple owners and multiple permissions. For example, by specifying the permissions on the added attributes as "600" the owner of the new attributes can read and write the new attributes even though the owner has no write permission to the original attributes in the profile. Essentially, no other entity can see that the original profile has been extended. This example demonstrates the dynamic extensibility of the profile service in accordance with the present invention. Although this dynamic extensibility feature is desirably activated, it can be deactivated by a profile owner.

In yet another example, a user desires to share access to data and/or application software (referred to herein as the limited access data and/or software) with a select set of other entities. To enable this information to be exclusively shared with the desired entities, the user creates an entity profile for herself where the entity profile includes a sub-profile (e.g., "users") that contains attributes needed to access the limited access data and/or software. The user then defines a group of authorized entities and sets the group meta-data entry for the user sub-profile binding to the defined group. By setting the permission for this sub-profile binding to "640" the authorized group will have read privileges for the limited access data and/or software. The sub-profile is invisible to all but the limited access data and/or software and entities that are members of the defined group. However, members of the group can now read the user profile extensions to enable exclusive access to the limited access data and/or software application.

To understand the power of these examples it is important to note once again that an entity may be a human user, another software application, hardware device, or the like. It may be intended that the limited access data and/or software of the latter example be accessible to one suite of application software while not available to other application software. In such a case the defined group comprises the authorized application software. More specifically, the limited access data may represent bank account numbers or the like that should only be accessible to applications that provide suitable security. The bank account numbers can be made accessible to email or web browser applications that enforce the required security, while made unavailable to corresponding applications that fail to supply the required security protocols. Remaining portions of the user profile can be made available to both types of email applications making the shared information readily accessible.

Figure 6A:
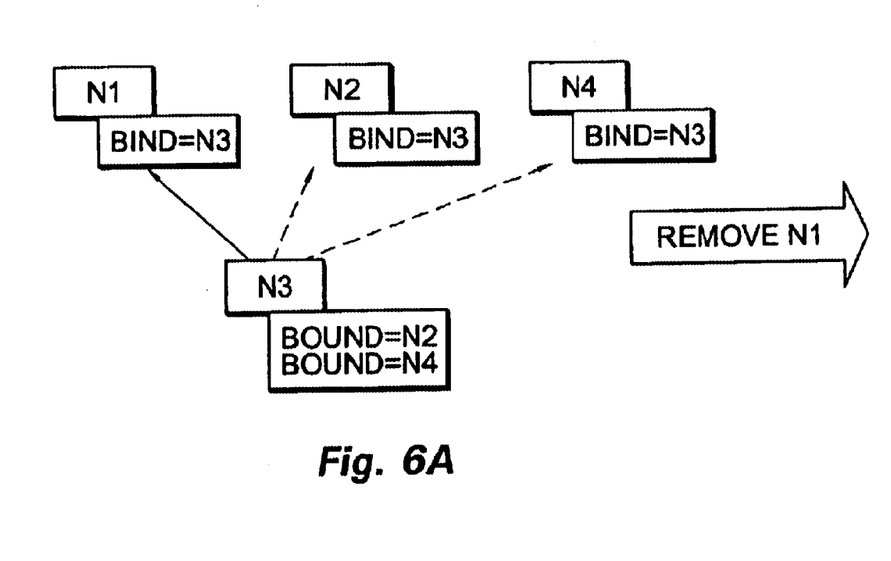
FIG. 6A and FIG. 6B show related profiles in an exemplary embodiment of the present invention.

As can be seen with reference to FIG. 6A, a first profile N1 and a second profile N2 each have a third profile N3 bound to them. In addition, the third profile N3 is bound to a fourth profile N4. An attribute associated with each of the parent profiles N1, N2, and N4 shows that N3 is bound to that parent profile, with the key=value pair of bind=N3. The bind of profile N3 to profile N1 is a True Bind in which the storage of profile N3 is physically associated with the storage of profile N1. This is manifested in the ResourceID of profile N3. This True Bind is illustrated in the diagram of FIG. 6A by a solid line linking profile N3 to profile N1. On the other hand, the dashed lines linking profile N3 to the parent profiles N2 and N4 represent a Link Bind as opposed to a True Bind. In other words, there is only one storage location for profile N3 and it is associated with profile N1, no additional copies of profile N3 exist for direct association with profiles N2 and N4. Instead, a Link Bind is established by storing attributes in the profile N3 to reflect that profile N3 is bound to profiles N2 and N4. Profile N3 can be referred to as a sub-profile or child with respect to parent profiles N1, N2, and N4.

Any number of profiles can be made dependent on any other profile, with the exception that a profile can only be directly bound to one of its sub-profiles via a Link Bind as opposed to a True Bind. A user can always query a profile and discover all the children of that particular profile. As implemented, a user cannot query a profile and find out all the parents to which the profile is bound. While there is no technical reason why this functionality is not given to the user, it is not currently implemented, although it could be implemented in this fashion.

Figure 6B:
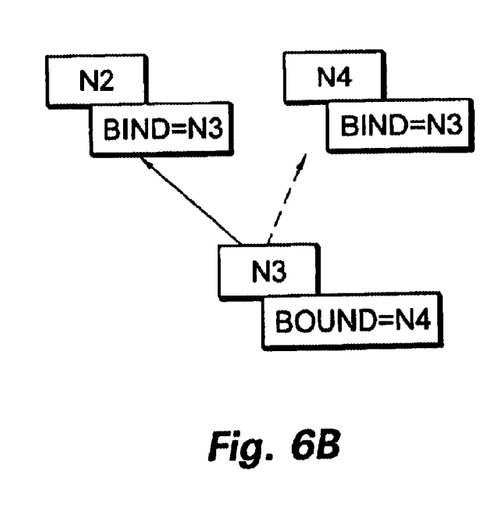

One issue arises when it is desired to delete a profile. In the simple example of FIGS. 6A and 6B, when profile N1 is deleted, there is a ripple effect on profiles N2, N3, and N4. First of all, sub-profile N3 is losing the parent to which it has a True Bind, so it must find a new parent for a True Bind. In the example of FIG. 6B, this is to profile N2. Because the sub-profile N3 is now truly bound to profile N2 and this information is manifested in the ResourceID of profile N3, the attribute of profile N3 showing a bind to profile N2 is no longer necessary and is shown in FIG. 6B as deleted. In addition, the bind information for profiles N2 and N4 must be updated to reflect the new ResourceID of profile N3. This is explained more fully in the flowchart of FIG. 7.

Figure 7:
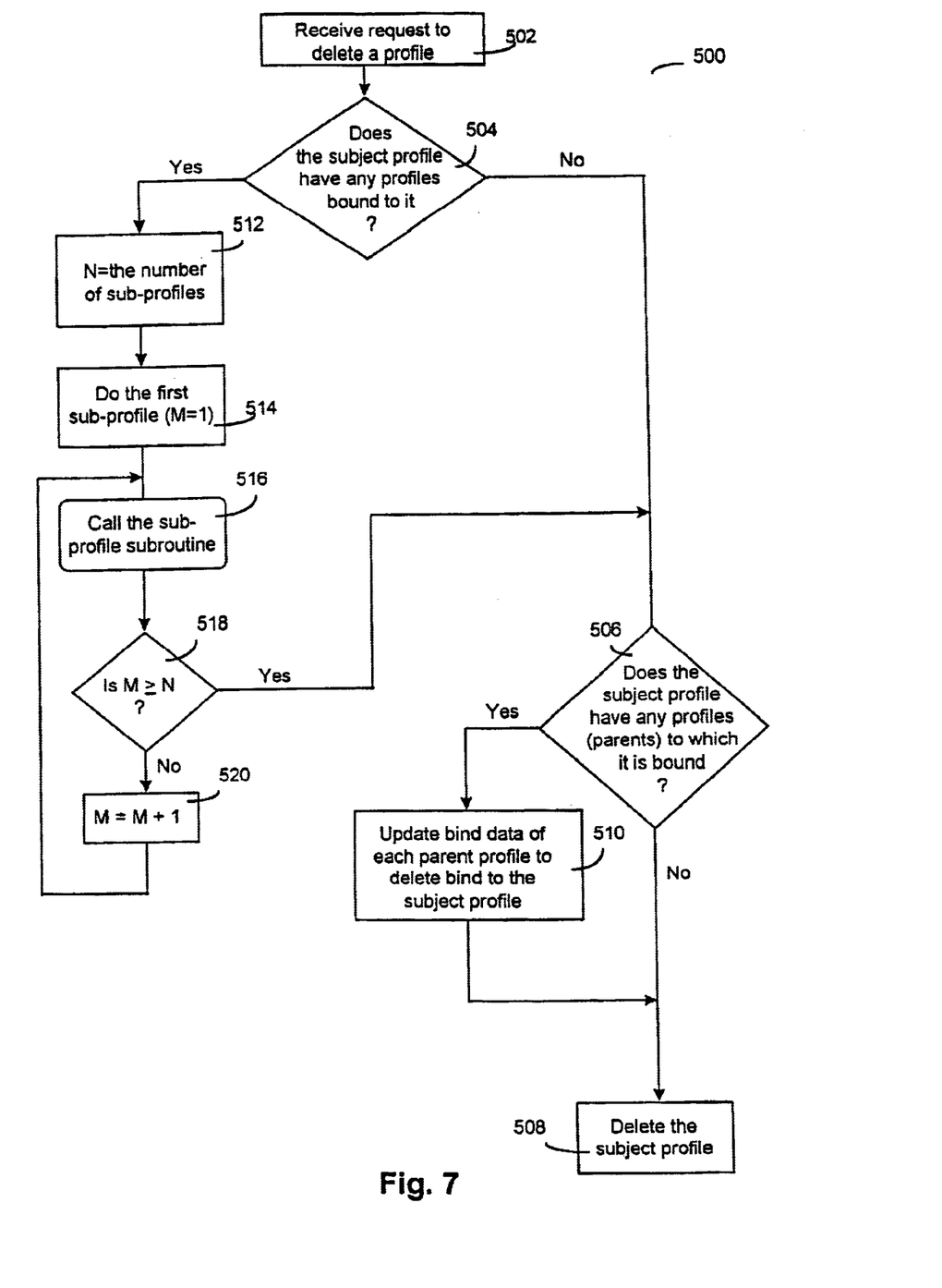
FIG. 7 shows a flowchart illustrating an exemplary process flow of the present invention that is followed when a request is made to delete a profile.

Flowchart 500 represents the process followed internally by the profiling service when a request is made to delete a profile. First, the service receives (502) a request to delete a profile, referred to throughout the flowchart 500 as the subject profile. A test is performed to determine (504) if the subject profile has any profiles bound to it. If not, a test is performed (506) to see if the subject profile has any parent profiles to which it is bound. If not, the subject profile is deleted (508). Most typically, however, the subject profile will either be bound to other profiles or have other profiles bound to it.

If the test determines (504) that the subject profile does have profiles bound to it, then a variable N is set (512) equal to the total number of sub-profiles. A variable, M, is then set (514) equal to one so that the first sub-profile can now be processed by this routine and a loop is begun. First, a sub-profile subroutine is called (516). This subroutine will be described in future detail below with reference to FIG. 8. After the sub-profile subroutine performs its functions and returns, a test is performed to determine (518) if the variable M is greater than or equal to N, the total number of sub-profiles. If yes, then all the sub-profiles have been processed and process flow goes to the previously-described test (506) in which it is determined whether the subject profile has parent profiles. If, however, the test (518) determines that not all the sub-profiles have been processed, then the variable M is incremented (520) and process flow returns to the beginning of the loop. In such case, the sub-profile subroutine is again called (516) and the test is again made (518), in an iterative fashion until the loop is completed after processing each of the sub-profiles.

When the test (506) determines that the subject profile does have parent profiles to which it is bound, then the bind data is updated (510) for each parent profile to delete the bind to the subject profile. After this is performed, then the subject profile is deleted (508).

Figure 8:
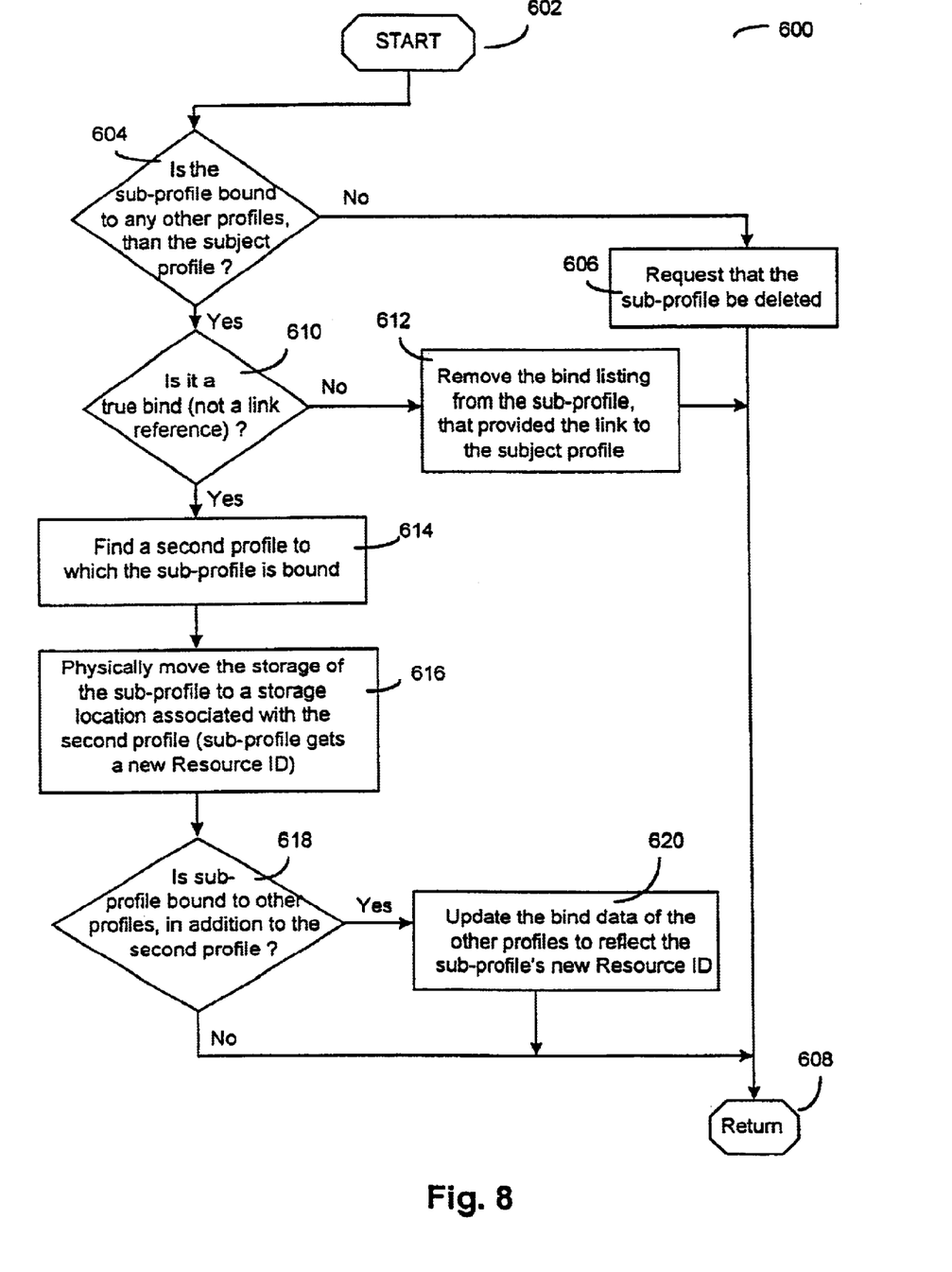
FIG. 8 shows a flowchart illustrating an exemplary process flow followed by a subroutine called by the flowchart of FIG. 7.
Figure 9:
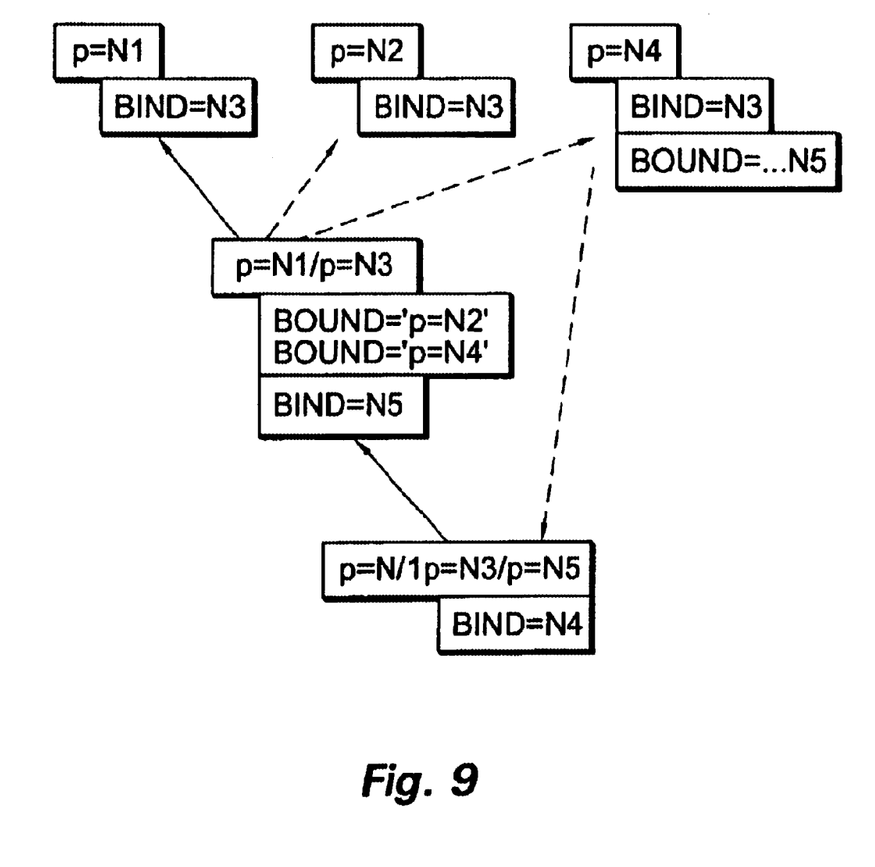
FIG. 9 shows related profiles in a circular arrangement in an exemplary embodiment of the present invention.

As shown in FIG. 8, the sub-profile subroutine 600 is started (602) when called by the routine 500. First, a test is performed to determine (604) if the sub-profile is bound to any other profiles, than the subject profile. If not, then a request is made (606) that the sub-profile be deleted. Of course, this request will subsequently result in a call to the routine 500 to perform this whole process again, using the sub-profile as the subject profile. After the request is made (606), the subroutine 600 ends and returns (614) to the routine 500 which called it. If, however, the sub-profile is bound to other profiles, then a test is performed to determine (610) if the bind to the subject profile is a True Bind and not a Link Bind. If not, meaning that it is a Link Bind, then the bind listing on the sub-profile is removed (612) to no longer provide a link to the subject profile and the subroutine 600 ends by returning (614) to the routine 500 which called it. If, however, the bind of the sub-profile to the subject profile is a True Bind, then a second parent profile to which the sub-profile is bound is found (614). Next, the storage of the sub-profile is physically moved (616) to a storage location associated with the second parent profile. By doing so, the sub-profile gets a new ResourceID. After this is done, a test is performed to determine (618) if the sub-profile is bound to other profiles, in addition to the second profile to which it has now associated storage. If not, then the subroutine 600 ends and returns (614) to the routine 500 which called it. If, however, the sub-profile is bound to other profiles, then the bind data of the other parent profiles is updated (620) to reflect the sub-profile's new ResourceID. Then, the subroutine 600 returns (614) to the routine 500 which called it. In summary, each time a profile is deleted, there is a determination made of all the parents and children of that subject profile so that they can be updated or deleted, as appropriate.

As shown in FIG. 8, the sub-profile subroutine 600 is started (602) when called by the routine 500. First, a test is performed to determine (604) if the sub-profile is bound to any other profiles, than the subject profile. If not, then a request is made (606) that the sub-profile be deleted. Of course, this request will subsequently result in a call to the routine 500 to perform this whole process again, using the sub-profile as the subject profile. After the request is made (606), the subroutine 600 ends and returns (608) to the routine 500 which called it. If, however, the sub-profile is bound to other profiles, then a test is performed to determine (610) if the bind to the subject profile is a True Bind and not a Link Bind. If not, meaning that it is a Link Bind, then the bind listing on the sub-profile is removed (612) to no longer provide a link to the subject profile and the subroutine 600 ends by returning (608) to the routine 500 which called it. If, however, the bind of the sub-profile to the subject profile is a True Bind, then a second parent profile to which the sub-profile is bound is found (614). Next, the storage of the sub-profile is physically moved (616) to a storage location associated with the second parent profile. By doing so, the sub-profile gets a new ResourceID. After this is done, a test is performed to determine (618) if the sub-profile is bound to other profiles, in addition to the second profile to which it has now associated storage. If not, then the subroutine 600 ends and returns (608) to the routine 500 which called it. If, however, the sub-profile is bound to other profiles, then the bind data of the other parent profiles is updated (620) to reflect the sub-profile's new ResourceID. Then, the subroutine 600 returns (614) (608) to the routine 500 which called it. In summary, each time a profile is deleted, there is a determination made of all the parents and children of that subject profile so that they can be updated or deleted, as appropriate.

As can be appreciated, there are methods or operations utilized to update the binds between particular profiles. The first is an "AddBind" which includes the parameters "actionKey" (operation ID) and "parent ResourceID." Another operation is "RemoveBind" which has parameters "actionKey" and "parent ResourceID." A third operation is "RelocateBind" (also known as ReBind) which has parameters "actionKey," "old child ResourceID," and "new child ResourceID."

The computer program product devices in accordance with the present invention include elements that operate in a server such as server 107, a client such as workstation 111, or both. It is contemplated that elements may be stored remotely, delivered to a client system on demand by a server computer, and executed partially or completely by the server and client. Accordingly, the present invention is not limited by the method of distribution or packaging that a particular application involves. In other words, the present invention may be distributed client-only software devices, server-only software devices, or as system software that is distributed to both client and server devices.

Advantages

The present invention provides a system for maintaining referential integrity in a data architecture. One advantage is that most of the processing is not seen by the user. Another advantage is that only one copy of any particular profile or data record is kept. Thus, any data synchronization issues are minimized. Because of the True Binds and Link Bind attributes, it is possible to associate any data record with any other data record and to be able to update this bind attribute information as necessary when profiles are deleted or moved. In this manner, the profiles can refer to each other as needed such as in a tree-type data architecture. Another advantage of only storing one copy is a savings in memory resources. Also, although the techniques of automatically maintaining referential integrity have been discussed with regard to a profiling service, it is believed that the concepts could be equally applicable to other data architectures, such as any tree-structured system or traditional relational databases.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method of providing referential integrity in a data architecture, the data architecture including a plurality of data elements, wherein certain of the data elements are linked to other of the data elements, the method comprising:
    providing the ability for a first data element to depend from and be linked to a second data element;
    providing the ability for the first data element to also depend from and be linked to a third data element;
    when a given data element is to be deleted, checking to see if the given data element has other data elements depending from the given data element;
    if the given data element has other data elements depending therefrom, deleting the dependent data elements if the dependent data elements are not dependent on other data elements; and
    if the given data element has other data elements depending therefrom and the dependent data elements are dependent on other data elements, determining if the dependent nature of the dependent data element to the given data elements is a true bind or is a link reference;
    wherein the first data element is only stored in one location, the storage being associated with the second data element, with only a referential link between the first data element and the third data element.

2. A method as defined in claim 1, wherein the location of the first data element is associated with the second data element through a ResourceID.

3. A method as defined in claim 1, further including providing the ability for a fourth data element to depend from and be linked to the first data element.

4. A method as defined in claim 3, wherein the fourth data element can depend from and be linked to any one of, or any combination of, the first, second, and third data elements.

5. A method as defined in claim 3, wherein the second or third data element can depend from and be linked to the fourth data element.

6. A method as defined in claim 1, wherein the second or third data elements can depend from and be linked to other data elements.

7. A method as defined in claim 1, further including:
    if the dependent nature of the dependent data element to the given data element is a true bind, changing the storage of the dependent data element to a storage associated with one of the other data elements to which the dependent data element is dependent.

8. A method as defined in claim 7, further including:
    determining if the dependent data element is also dependent on data elements in addition to the one to which the dependent data element now has associated storage.

9. A method as defined in claim 8, further including:

if the dependent data element is also dependent on data elements in addition to the one to which the dependent data element now has associated storage, updating linking information related thereto.

10. A data architecture comprising:

a plurality of data elements including a first data element, a second data element, and a third data element, wherein certain of the data elements are linked to other of the data elements;

the first data element depending from and linked to a second data element; the first data element depending from and linked to a third data element;

wherein the first data element is only stored in one location, the storage being associated with the second data element, with only a referential link between the first data element and the third data element;

when a given data element is to be deleted, checking to see if the given data element has other data elements depending from the given data element;

if the given data element has other data elements depending therefrom, deleting the dependent data elements if the dependent data elements are not dependent on other data elements;

if the given data element has other data elements depending therefrom and the dependent data elements are dependent on other data elements, determining if the dependent nature of the dependent data element to the given data elements is a true bind or is a link reference; and if the dependent nature of the dependent data element to the given data element is a true bind, changing the storage of the dependent data element to a storage associated with one of the other data elements to which the dependent data element is dependent.

11. A data architecture as defined in claim 10, further including a fourth data element depending from and linked to the first data element.

12. A data architecture as defined in claim 11, wherein the fourth data element can depend from and be linked to any one of, or any combination of, the first, second, and third data elements.

13. A data architecture as defined in claim 11, wherein the second or third data element can depend from and be linked to the fourth data element.

14. A data architecture as defined in claim 10, further including:

determining if the dependent data element is also dependent on data elements in addition to the one to which the dependent data element now has associated storage; and if the dependent data element is also dependent on data elements in addition to the one to which the dependent data element now has associated storage, updating linking information related thereto.

15. A computer program product embodied on a propagating signal, comprising:

computer program devices readable by a data processor coupled to receive the propagating signal for providing referential integrity in a data architecture, the data architecture including a plurality of data elements, wherein certain of the data elements are linked to other of the data elements, the computer program devices including:

first program code devices configured to cause the data processor to provide the ability for a first data element to depend from and be linked to a second data element;

second program code devices configured to cause the data processor to provide the ability for the first data element to also depend from and be linked to a third data element;

third program code devices configured to cause the data processor to allow the first data element to only be stored in one location, the storage being associated with the second data element, with only a referential link between the first data element and the third data element;

fourth program code devices configured when a given data element is to be deleted to cause the processor to check to see if the given data element has other data elements depending from the given data element;

fifth program code devices configured if the given data element has other data elements depending therefrom to cause the processor to delete the dependent data elements if the dependent data elements are not dependent on other data elements; and sixth program code device configured if the given data element has other data elements depending therefrom and the dependent data elements are dependent on other data elements to cause the processor to determine if the dependent nature of the dependent data element to the given data elements is a true bind or is a link reference.

16. A computer program product as defined in claim 15 wherein the medium includes a magnetic disk.

17. A computer program product as defined in claim 15 wherein the medium includes an optical disk.

18. A computer program product as defined in claim 15 wherein the medium includes a propagating signal.

19. A computer program product as defined in claim 15 wherein the medium includes a random access memory device.

20. A method of maintaining profile information in a distributed computing environment, the method comprising:

providing a first profile with an ability to be referentially linked to other profiles and to have a single true bind to one other profile as indicated in an attribute element of the first profile;

providing a second profile with an ability to be referentially linked to other profiles and to have a single true bind to one other profile as indicated in an attribute element of the second profile; and providing a third profile with an ability to be referentially linked to other profiles and to have a single true bind to one other profile as indicated in an attribute element of the third profile;

wherein the attribute of the first profile indicates a true bind to the second profile and the first profile is stored in a single location associated with the second data element and the attribute of the first profile indicates only a referential link between the first data element and the third data element and further wherein a later deleting of the second profile includes changing the single storage location of the first profile to a storage associated with another profile to which the first profile is determined dependent.

* * * * *